(12) United States Patent
Nishiki

(10) Patent No.: US 6,184,934 B1
(45) Date of Patent: Feb. 6, 2001

(54) VIDEO SIGNAL PROCESSING APPARATUS AND COMPOSITE IMAGE ADJUSTMENT METHOD

(75) Inventor: Nobuhiko Nishiki, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/328,096

(22) Filed: Jun. 8, 1999

(30) Foreign Application Priority Data

Jun. 10, 1998 (JP) .................................................. 10-162290

(51) Int. Cl.$^7$ ................................. H04N 7/00; H04N 9/74
(52) U.S. Cl. ........................... 348/383; 348/595; 348/580
(58) Field of Search ............................. 348/383, 36, 39, 348/580, 581, 595; H04N 7/00, 9/74

(56) References Cited

FOREIGN PATENT DOCUMENTS 11-98439 * 4/1999 (JP) .

* cited by examiner

Primary Examiner—Sherrie Hsia
(74) Attorney, Agent, or Firm—Frommer Lawrence & Haug, LLP.; William S. Frommer

(57) ABSTRACT

A video signal processing apparatus inputting a plurality of video signals, making the plurality of video signals in parallel in order to display them as one image and setting peripheral parts of images which are adjacent to each other when they are placed in parallel as overlapped areas, and being able to execute a necessary correction processing about the video signals corresponding to the overlapped areas comprising: a remote controller being able to set the correction starting position and the correction end position, a correction data memory storing the correction data corresponding to the correction starting position and the correction end position set by the remote controller, and a control portion reading out the predetermined correction data from the correction data memory based on the correction starting position and the correction end position in a case where the correction starting position and the correction end position have been set.

12 Claims, 7 Drawing Sheets

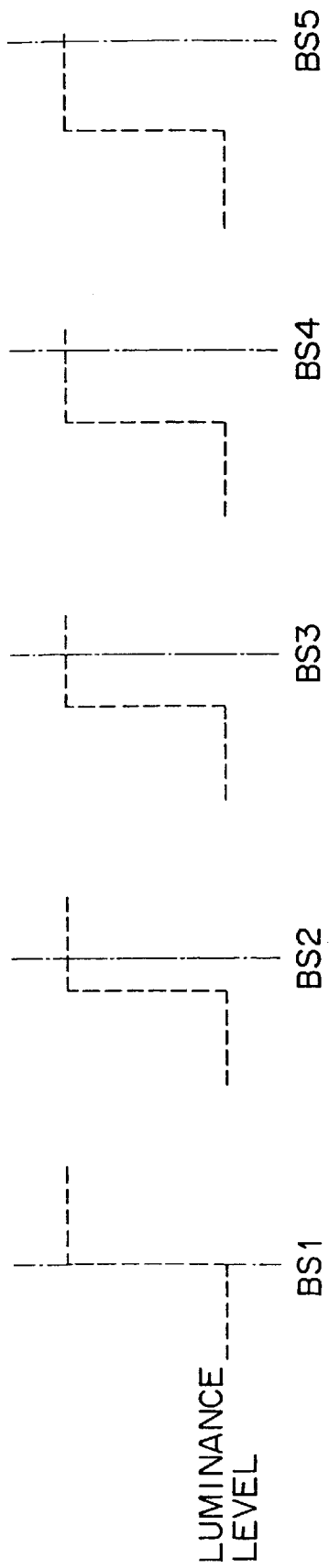

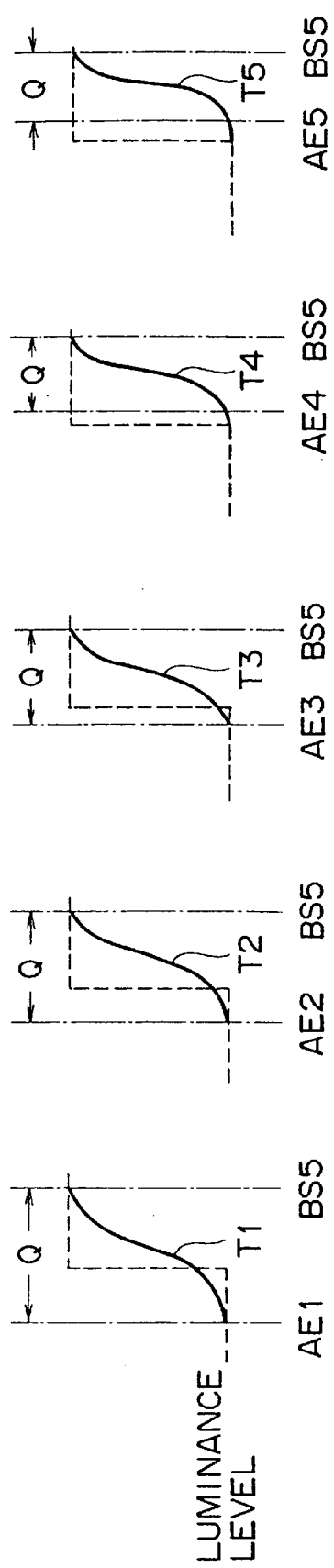

VIDEO SIGNAL PROCESSING APPARATUS AND COMPOSITE IMAGE ADJUSTMENT METHOD

BACKGROUND OF THE INVENTION

The present invention relates to a technology being useful in forming a large sized image in composing video signals of more than two.

Recently, it is known to the public to form a large sized image on a screen by using a plurality of projectors to display split images in making them be adjacent to each other in generating video signals corresponding to respective parts of an image split into predetermined areas.

FIG. 6 shows a drawing for explaining an example of an image display system using a soft edge matching device (hereinafter referred to as SEM device taking the first letters of the device) which enables to form a good image in correcting the joint (overlapped areas) of respective split images when the images are displayed being adjacent to each other.

As shown in FIG. 6, for a video signal source 50 for forming a composite image, for example, a personal computer device 51, a work station system 52, a hard disk data base device 53, a video playback device 54, or other variety of playback devices can be used. It is also possible to form split images from the image photographed by a video camera, or the like as photographing means though they are not shown in a drawing. These playback devices are typically shown in parallel in FIG. 6; however, all of them are not necessarily needed, and each device can be individually used or a plurality of them can be simultaneously used.

It is also possible to form a video signal source 50 with one unit of a playback device such as a hard disk data base device 53, a video playback device 54, or the like, and a video signal output from one unit of equipment is stored once as video data in the computer device 51 or the work station device 52, and by splitting an image on the screen, a plurality of video signals are generated corresponding to the split images, and output them as R, G, B component signals. In this case, a synchronizing signal can be superposed, for example, on a G signal or it can be treated as a separate signal and output through a cable to be solely used by it.

The plurality of video signals corresponding to the split images output from the video signal source 50 are respectively supplied to the SEM device 60. The SEM device 60 performs signal processing for a plurality of signals to make the overlapped areas corresponding to the end parts of respective images (joint parts of divided images) be continuous, and supply them to the projector devices, 70A, 70B and 70C, corresponding to the plurality of split images. FIG. 6 shows a plan view showing three projector devices; however actually there are provided projector devices corresponding to the number of video signals (number of split images) supplied from the video signal source 50.

The signal processing in the overlapped areas is executed by the operation of various kinds of operating keys disposed in the remote controller 61.

The projector devices 70 (A, B and C) convert the video signals to projection images with ordinary cathode ray tubes of high luminance, and project the images as a composite image on a screen 80. It is possible to constitute the projector devices 70 (A, B and C) with liquid crystal projector devices.

FIG. 7 shows, for example, images A and B, as two split images being disposed adjacent to each other in the horizontal direction, and a typical drawing for explaining an example displaying adjacent end parts being overlapped, and the screen 80 shows a case where the projected image A and the image B are disposed being adjacent to each other.

The adjacent parts of the image A and the image B, that is, the joint part is the overlapped area Q where the images are overlapped, and in the overlapped area Q, it is a prerequisite that the video signals are supplied to make the image A and the image B the same image. For such a video signal, an image may be produced considering the adjacent parts before hand, or the adjacent parts may be formed for an existing image with a personal computer device 51, or the like.

In FIG. 7, the video signals corresponding a horizontal period of the image A and the image B are shown as a video signal VA and a video signal VB, and the area hatched with the lines downward to the right corresponds to the overlapped area Q. Therefore, the video signal VA and the video signal VB comprise the information which makes it possible to form the same image in the overlapped area Q. Thereby, an image having no joint visually can be displayed.

However, in the Q area, even though the same video is formed and a desired image is formed, since a plurality of video are overlapped, the luminance becomes high partially, and it is needed to perform the luminance correction. Therefore, in the case of the video signal VA or the video signal VB, the correction starting point AE and the correction end point BS are set and the signal processing is so performed that the luminance level between the above-mentioned two points, AE and BS, of the video signal VA has a fade-out characteristic and that of the video signal VB has a fade-in characteristic. The overlapped area Q shows an area where the same video is to be formed, so that the correction starting point AE and the correction end point BS do not always coincide with each other.

In short, when two images are projected on the screen 80 using two units of projector devices 70 after the signal processing (luminance correction process) as mentioned in the above, the luminance level in the overlapped area Q of the screen 80 becomes the same level as those of the other parts in the image A or the image B, and the joint of these two images becomes unnoticeable.

Since the overlapped area Q shows an area where the same image is to be formed, the correction starting point AE and the correction end point BS do not always coincide with each other. When an area close to the left end of the video signal VA is made to be an over-scan area OS and an area close to the right end of the video signal VB is also made to be an over-scan area OS, it is possible to prevent the appearance of the edges of the image A and the image B on both ends of the screen 80.

Further, for example, when a composite image is displayed with three units of projector devices 70, video signals, Va and Vc, (Only those in a horizontal period are shown.) on the left and the right sides as shown in FIG. 8 correspond to the video signals, VA and VB. In the case of a video signal Vb to form an image in the central part, the end area 'ae' of the video signal Va and the starting area 'bs' of the video signal Vb are made to be an overlapped area Q. The end area 'be' of the video signal Vb and the starting area 'cs' of the video signal Vc are made to be an overlapped area Q, and the signals there are processed to be the same video signals.

Then, in these areas the fade-out process and the fade-in process are performed, and it is possible to perform the luminance correction of the edge parts of the images at the two boundary parts produced when three images are placed to be adjacent to each other.

In the prior art, it is arranged that the position setting of the correction starting point and the correction end point is performed for the waveform data to be corrected being set beforehand in the SEM device 60 and the desired correction data are calculated in performing a predetermined process based on the positions of these points. And the image status in the overlapped area Q is improved by superposing the calculated correction data on the video signal.

Therefore, the SEM device 60 has to perform an operational processing for obtaining the correction data, thus a control means is burdened to perform the operational processing.

For example, there is a method known to the public in which a detailed setting is performed using a computer, or the like and even fine adjustment is possible. However, there remains a problem that the operation to perform such a detailed setting is troublesome and an optimum correction data is not easily obtained.

SUMMARY OF THE INVENTION

The present invention was invented to solve such a problem. A video signal processing apparatus according to the present invention composing the images formed with a plurality of input video signals in placing them adjacent to each other, in order to display them as a composite image, setting the end parts of the images being adjacent to each other as an overlapped area, and performing a correction process of the luminance level for the video signal corresponding to the overlapped area with the correction data, being provided with a setting means for setting the correction starting position and the correction end position in the overlapped area, a correction data storage means for storing a plurality of correction data corresponding to the correction starting position and the correction end position, and a control means for controlling the read-out of the predetermined correction data from the correction data storage means based on the setting of the correction starting position and the correction end position.

In the present invention, the predetermined correction data corresponding to the correction starting position and the correction end position are stored beforehand, so that there is no need to be provided with an operation processing means for obtaining the correction data. Therefore, for example, it is possible to decrease the load of executing processes of the control means, or the like when the luminance correction in the overlapped area is performed.

Further, the correction in the overlapped area can be performed by selecting the correction data out of the data stored beforehand, so that it is possible to simplify the setting operations in executing correction.

As explained in the above, in the present invention there are stored necessary correction data corresponding to a correction starting position and a correction end position beforehand, so that it is made possible to execute luminance correction in an overlapped area by selecting the correction data without requiring the correction data to an operational process means. Therefore, it is made possible to lighten the required load of an operational processor such as a control means for executing the luminance correction in the overlapped area.

Further, the correction in the overlapped area is executed by selecting the correction data stored in the device beforehand, which makes it possible to simplify various setting operations for executing correction.

Moreover, fine adjustment data is stored beforehand, the data which are able to execute fine adjustment for the luminance in the overlapped area which has been corrected by the correction data. Therefore, fine adjustment can be executed by superposing the selected fine adjustment data on the correction data which have been selected. Thereby, it is made possible to perform the setting for fine adjustment easily, and also to upgrade the operability of fine adjustment.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 3A to 3E show drawings for explaining a correction end point;

FIGS. 4A to 4E show drawings for explaining a correction starting point and a correction waveform;

DETAILED DESCRIPTION OF THE PREFERRED EMBODIMENTS

An embodiment of a video signal processing apparatus according to the present invention will be explained in the following.

Figure 1:
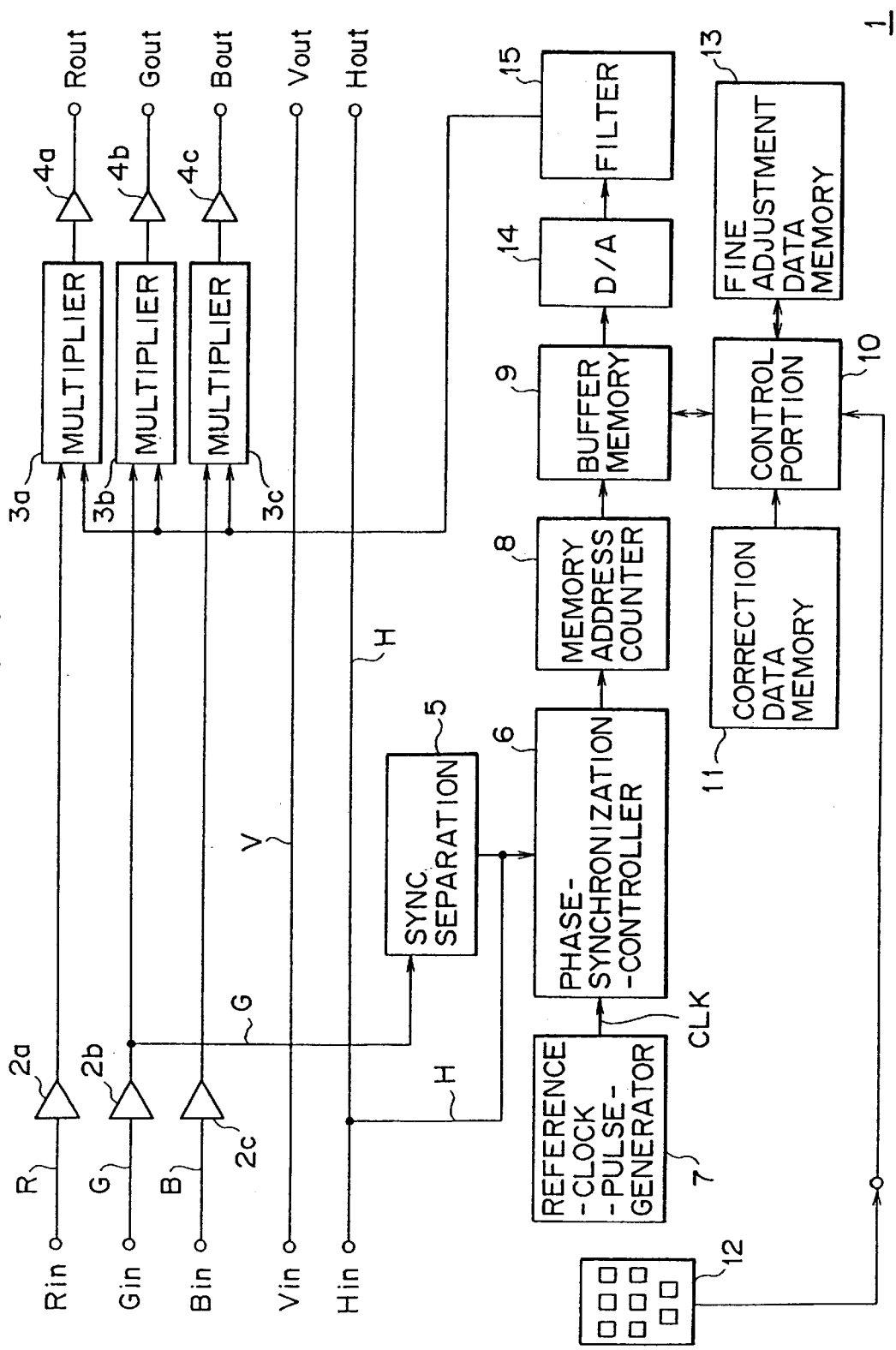
FIG. 1 shows a block diagram for explaining a SEM device in the embodiment according to the present invention.

FIG. 1 shows a block diagram for explaining the principal part of the soft edge matching device (SEM device) in the present embodiment.

Figure 6:
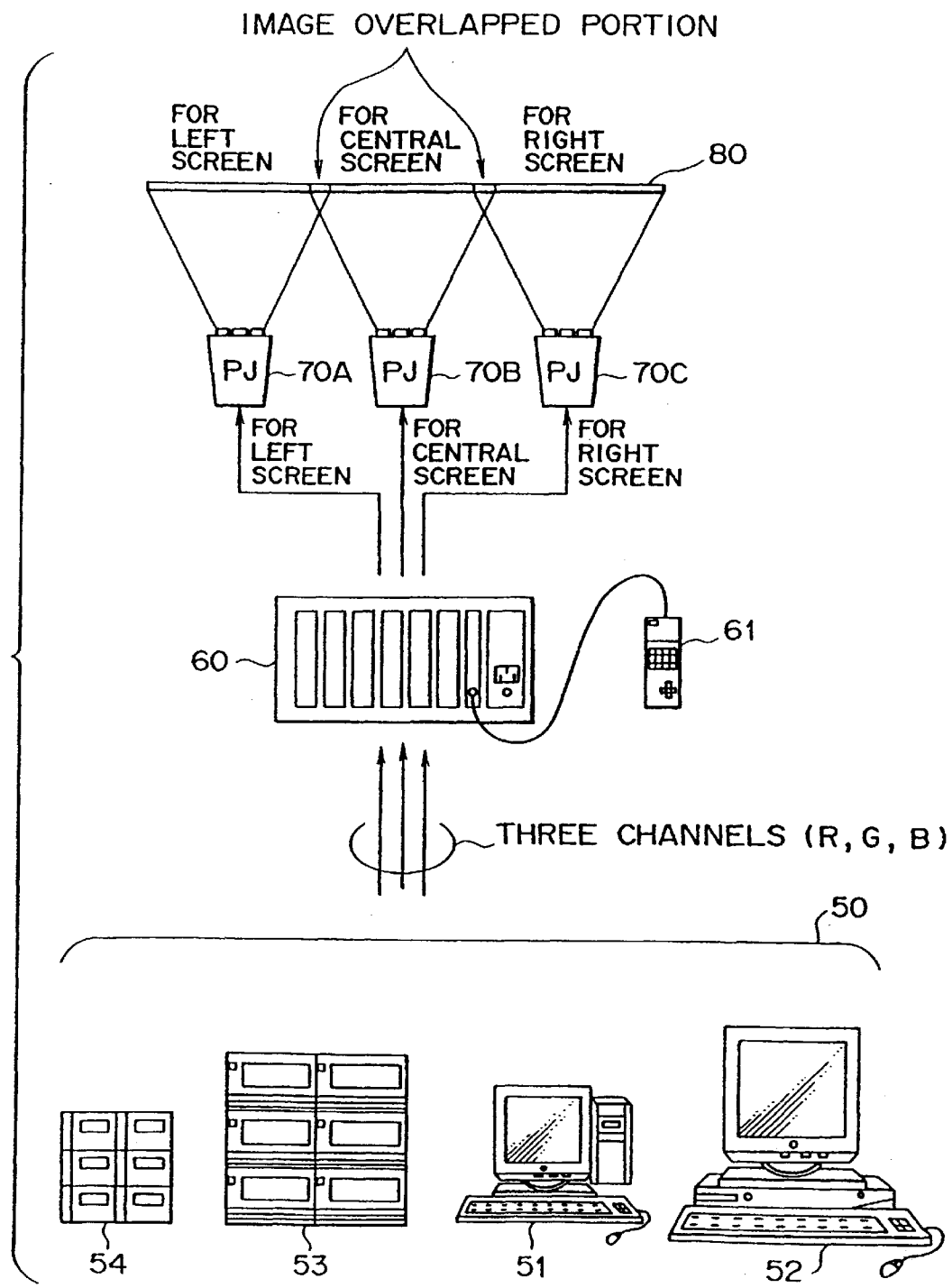
FIG. 6 shows a drawing for explaining an image display system using a conventional SEM device.

In the SEM device, as explained in FIG. 6, there are provided a plurality of signal paths corresponding to respective projector devices to be able to supply image signals to a plurality of projector devices; however in FIG. 1, for the sake of convenience, a signal path of one system corresponding to one unit of a projector device. The SEM device 1 shown in this figure is made to be able to execute a signal process in an overlapped area which corresponds to the SEM device shown in FIG. 6.

Input terminals, Rin, Gin and Bin, denote input terminals for inputting video signals for respective colors, R, G and B, supplied from a video signal source, not shown in a drawing. (It corresponds to the video signal source 50 shown in FIG. 6.)

The video signals, R, G and B, corresponding to colors, red, green and blue, input from the input terminals, Rin, Gin and Bin, are clamped in buffer amplifiers, 2a, 2b and 2c, and then they are subjected to the necessary multiplication processes in multiplier portions, 3a, 3b and 3c, to be explained later, and output from output terminals, Rout, Gout and Bout, through buffer amplifiers, 4a, 4b and 4c.

The video signals, R, B and G, output from these output terminals, Rout, Gout and Bout, are supplied to projector devices, not shown in a drawing. The projector devices correspond to the projector devices 70 (A, B and C) shown in FIG. 6.

When, for example, a synchronizing signal is superposed on the video signal G, the video signal G is also supplied to the synch separation portion 5.

An input terminal Hin and an input terminal Vin are terminals for inputting a horizontal synchronizing signal H and a vertical synchronizing signal V which are supplied through different paths from video signals as those for computer graphics, or the like. Here, since split images are assumed to be adjacent to each other in the horizontal direction in the present embodiment, the vertical synchronizing signal is considered not to concern principal matters, so that it is shown in the figure that the vertical synchronizing signal V is output from the output terminal Vout as it is.

The horizontal synchronizing signal H is output from the output terminal Hout and also supplied to a phase-synchronization-control-portion 6.

In a constitution where split images are made to be adjacent to each other in the vertical direction, the vertical synchronizing signal V will be supplied to the phase-synchronization control-portion 6.

For example, the video signal G is supplied to the synch separation portion 5, and the horizontal synchronizing signal superposed on the video signal G is extracted and supplied to the phase-synchronization-control-portion 6.

A reference-clock-pulse-generator-portion 7 is composed of, for example, a crystal oscillator, or the like, and it outputs, for example, a fixed clock pulse CLK of 50 MHz independent of the synchronizing signal supplied from an external circuit.

The phase-synchronization-control-portion 6 inputs the horizontal synchronizing signal H input from the input terminal Hin or supplied from the synch separation portion 5, and performs phase-lock of the clock pulse CLK of, for example, 50 MHz. The correction jitter of the output video signal (In this case, for example, the correction jitter means a phenomenon wherein an irregular fluctuation in the pulse width of the clock pulse CLK in every period of the horizontal synchronizing signal H results in the luminance fluctuation in the output video.) can be prevented by the phase-lock. As mentioned in the above, when the split images are made to be adjacent to each other in the vertical direction, the vertical synchronizing signal V is supplied to the phase-synchronization-control-portion 6 and the same control is executed as in the case of the horizontal synchronizing signal H.

The accuracy of the clock pulse CLK directly affects the quality of the output video, so that it is desirable to constitute the reference-clock-pulse-generator-portion 7 with a crystal oscillator, or the like which is superior to, for example, a PLL circuit in accuracy and also in stability. Such a circuit can be realized with a TTL (Transistor-Transistor Logic) crystal oscillator, or the like.

A memory address counter 8 is a counter for controlling the timing of performing the read-out process of the correction data stored in a buffer memory 9 based on the clock pulse CLK output from the phase-synchronization-control-portion 7.

In the buffer memory 9, there are stored the correction data which are selectively read out from a correction data memory 11 beforehand by the control portion 10.

In the correction data memory 11, there are stored the correction data having various kinds of cosine waveforms, for example, 264 kinds.

The correction data is selected based on the information corresponding to the correction starting point AE and the correction end point BS in the overlapped area Q set by a user.

The setting of the correction starting point AE and the correction end point BS is performed by the necessary input operation for a input device such as a remote controller 12, and at a step when these two points have been set, the predetermined correction data is selected from the data memory 11 and stored in the buffer memory 9.

In a fine adjustment data memory 13, there are stored fine adjustment data for performing detailed luminance correction for the selected correction data based on the correction end point information and the correction starting point information. The above-mentioned fine adjustment means the correction for performing a detailed luminance correction when the luminance in the overlapped area is too high or too low in the projected image, being the result of correction performed in setting the correction starting point AE and the correction end point BS.

The above-mentioned fine adjustment can be performed by operating the remote controller 12.

The correction data read out from the correction data memory 11 or read out the correction data being superposed with the fine adjustment data and stored in the buffer memory 9 are read out at a predetermined timing based on the memory address counter 8, and converted to an analog signal in a D/A converter 14, and supplied to a filter 15. The filter 15 smoothes out the correction data converted to an analog signal in the D/A converter 14, and supplies the signal to the multipliers, 3a, 3b and 3c, as a luminance correction signal.

The control portion 10 controls the above-mentioned functional circuits, and also in a case where the correction end point and the correction starting point have been set by the remote controller 12, it reads out the correction data corresponding to the above setting information from the correction data memory 11 and stores them in the buffer memory 9. In a case where fine adjustment is performed, it reads out required fine adjustment data from the fine adjustment data memory 13 and superposes the data on the correction data stored in the buffer memory 9.

The multipliers, 3a, 3b and 3c, multiply video signals, R, G and B input from the input terminals, Rin, Gin and Bin, and the correction data output from the filter 15 as a luminance correction signal. Owing to the multipliers 3 (a, b and c), the video signals, R, G and B, wherein the luminance level in the overlapped areas Q is adjusted to predetermined values, are output from the output terminals, Rout, Gout and Bout, through buffer amplifiers, 4a, 4b and 4c.

Figure 2:
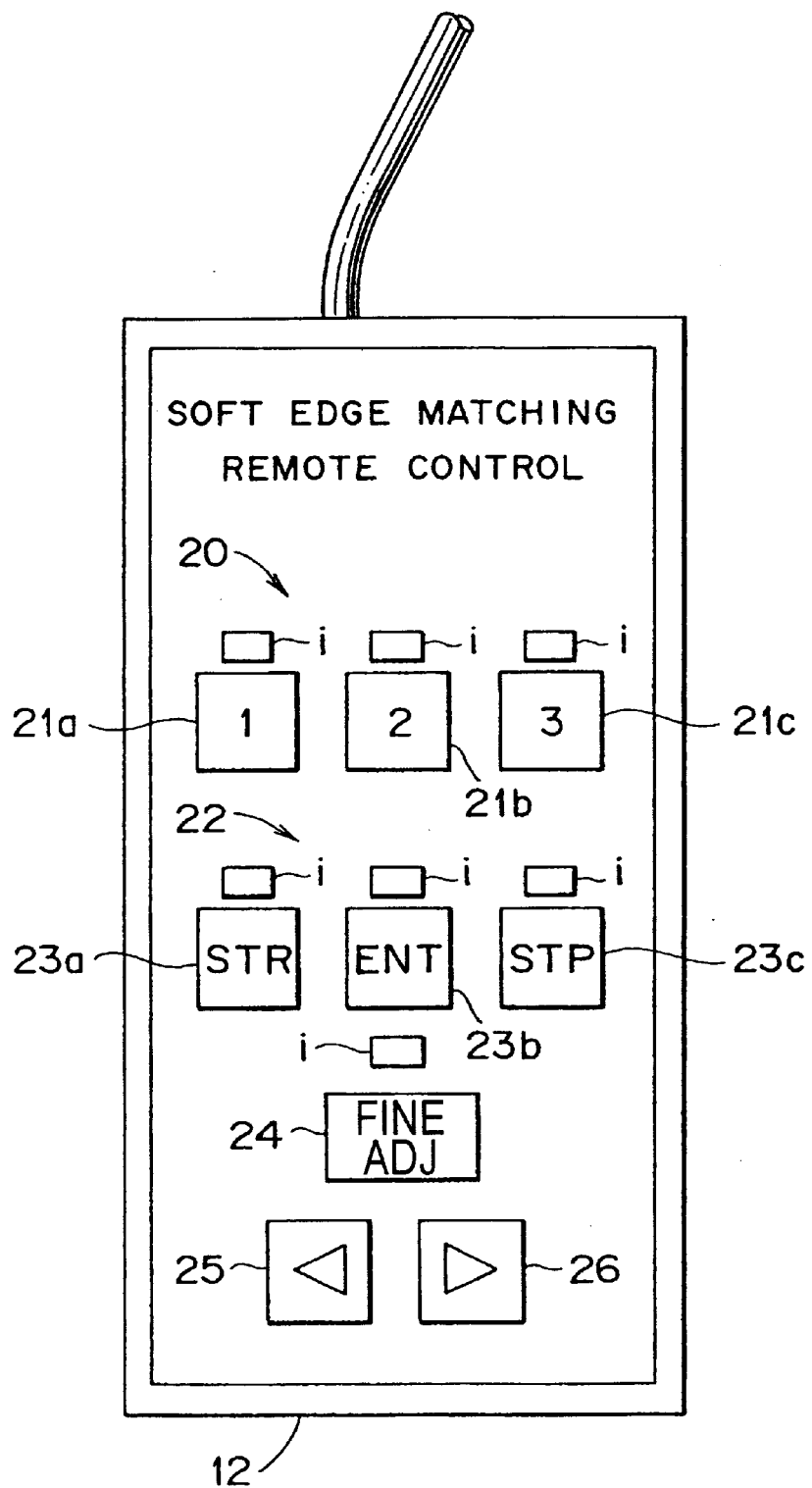
FIG. 2 shows a drawing for explaining the operational keys of a remote controller, an input device for the SEM device.

The functions of respective operational keys provided in the remote controller 12 will be explained referring to FIG. 2.

Figure 7:
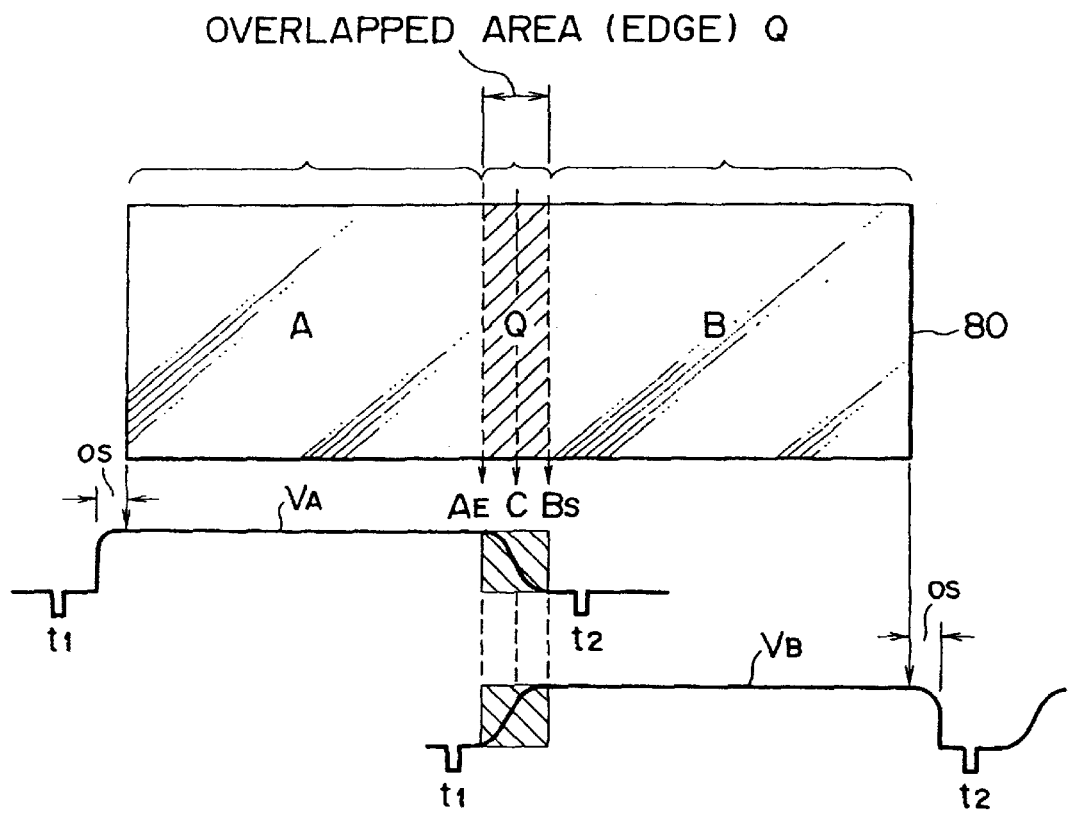
FIG. 7 shows a drawing for explaining an overlapped area when a plurality of images are placed to be adjacent to each other.
Figure 8:
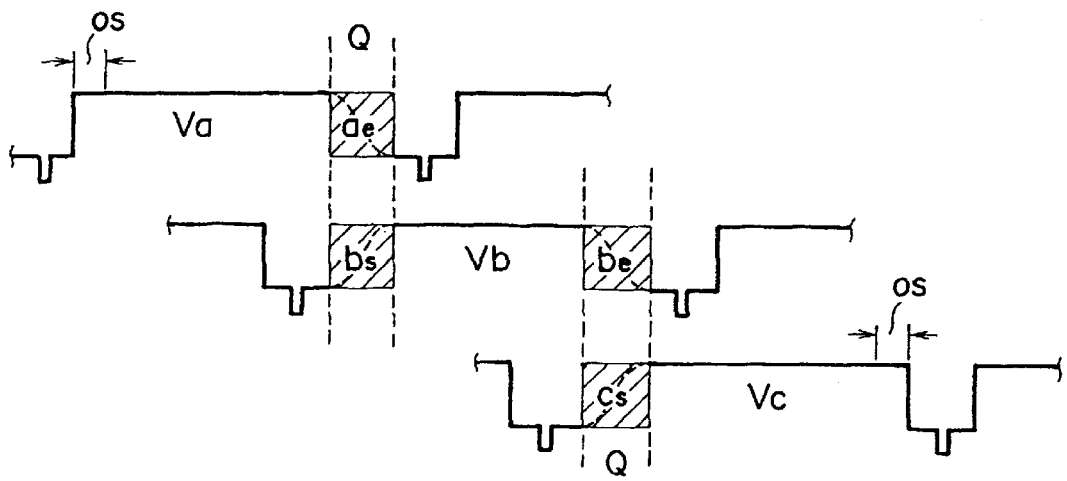
FIG. 8 shows a drawing for explaining an overlapped area when a plurality of images are placed to be adjacent to each other.

The remote controller 12 is an input device for adjusting the width of the overlapped area Q, or the positions of the correction starting point AE and the correction end point as shown in FIG. 7 when, for example, an image is composed of three images placed being adjacent to each other formed with video signals of three systems, and various kinds of commands are input to the SEM device 1 through a connecting cable of exclusive use. The position C denotes a position corresponding to the central portion of two images being adjacent to each other.

In the remote controller 12, there are provided various kinds of operational keys, for example, an image selection key group 20, a SEM selection key group 22, a fine adjustment key 24 and selection keys 25 and 26, or the like. In the vicinities of respective operational keys except the selection keys, 25 and 26, there are disposed select lamps 'I' which turn ON when an operational key combined with the lamp is selected.

The image selection keys 21 (a, b and c) are the keys for selecting the images to be the subjects of performing above-mentioned various kinds of adjustments, for example, when the image selection key 21a is selected, an image on the left side being projected by the projector device 70A shown in FIG. 6 is selected. In the similar way, a center image is selected by the image selection key 21b and a right side image is selected by the image selection key 21c.

In the above, three image selection keys, 21a, 21b and 21c, are provided corresponding to the images, left, center and right. However, actually the keys are provided corresponding to the number of images to be displayed.

In the SEM selection key group 22, there is disposed an operational key which performs the luminance correction, for example, when the starting point key 23a is operated, an operational mode is selected in which, for example, the position of the correction starting point AE is selected and when the end point key 23c is selected an operational mode is selected in which the position of the correction end point BS is selected. The positions selected by the starting point key 23a and the end point key 23c are decided by operating the enter key 23b.

The fine adjustment key 24 is provide as a key for selecting an operational mode in which fine adjustment of luminance in the overlapped area Q is performed.

The selection keys 25 and 26 are operational keys for executing the adjustment selected by the SEM selection key group 22, and different functions can be set corresponding to an operational mode being selected. Therefore, for example, it is possible to execute the selection of the positions of the correction starting point AE or the correction end point BS or the selection of luminance level in the case of a fine adjustment.

Next, an example in a case where the luminance correction is performed in the overlapped area Q using, for example, the remote controller 12 will be explained in the following.

FIG. 3A to FIG. 3E are the drawings for explaining the correction end point set by the remote controller 12. In these figures, a part corresponding to an overlapped area Q in a video signal, that is, the part of an image in which a luminance level is to be corrected is shown with a broken line.

As mentioned in the above, when the correction in the overlapped area Q is performed, at first, the correction end point BS is set as shown with a one dot chain line. The setting is performed in operating the selection key 25 or the selection key 26 after the selection of the end point key 23c. When a desired position has been selected, the correction end point is decided by the operation of the enter key 23b.

In these figures, for example, the correction end points are shown in five steps, from BS1 to BS5; however, it is shown, as an example, intermittently. Actually, it is made possible to select the correction end point by stages as occasion demands in making a position corresponding to the correction end point BS3 shown in FIG. 3C a reference point.

When the correction end point BS (in the present example, one out of BS1 to BS5) has been set, next, the correction stating point AE is set.

FIGS. 4A to 4E show the drawings for explaining the correction starting point. In FIGS. 4A to 4E, show, for example, a case where the correction end point BS5 has been set as shown in FIG. 3E. The correction starting points, AE1 to AE5, shown in these figures are shown intermittently as an example.

As shown in FIG. 4A, for example, when the correction starting point AE1 is set, based on the correction end point BS5 and the correction starting point AE1, the control portion 10 selects, for example, a correction waveform T1, as correction data, stored in the correction data memory 11 and stores in the buffer memory 9. In other words, FIG. 4A shows an example in which the correction waveform T1 is selected in corresponding to the combination of the correction end point BS5 and the correction starting point AE1.

As shown in FIGS. 4B to 4E, a correction waveform T2 (FIG. 4B) is selected corresponding to the combination of the correction end point BS5 and the correction starting point AE2, a correction waveform T3 (FIG. 4C) is selected corresponding to the combination of the correction end point BS5 and the correction starting point AE3, a correction waveform T4 (FIG. 4D) is selected corresponding to the combination of the correction end point BS5 and the correction starting point AE4, and a correction waveform T5 (FIG. 4E) is selected corresponding to the combination of the correction end point BS5 and the correction starting point AE5.

Concerning the correction starting point AE, it is also made possible to select by stages as occasion demands, for example, in making a position corresponding to the correction starting point AE3 a reference point as shown in FIG. 4C.

In FIGS. 4A to 4E, five kinds of correction waveforms are shown; however, as mentioned in the above, a large number of correction waveforms as many as, for example, 265 kinds of them produced by the combinations of the correction end points BS and the correction starting points AE are stored in the correction data memory 11. Therefore, the correction end points BS and the correction starting points AE shown in FIGS. 3A to 3E and 4A to 4E, can be set in the stages (BS1 to BSn, AE1 to AEn ... n: a natural number) to be able to select 265 kinds of correction waveforms T.

For example, in a case where the correction starting point AE4 or AE5 is positioned inside a video signal as shown in FIG. 4D and FIG. 4E, in a case where, for example, in the SEM device 1, there is not linear relation between the video output signal level and the input signal level, or in a case where the luminance in the peripheral part (including an overlapped area Q) of a split image is lower than the luminance in the central part, there can be a case where the luminance in the overlapped area Q is lowered more than a necessary degree by executing a correction, which causes the degradation of the image.

In a case where the luminance in the peripheral part is low, even in a case where the correction starting point AE4 or AE5 is not positioned inside a video signal, sometimes the luminance in the overlapped area Q is lowered.

In such a case, in order to correct the lowered luminance, necessary fine adjustment data is selected. The fine adjustment can be performed by a user: the user selects the fine adjustment key 24 and in the state where a fine adjustment mode is obtained, the user is able to perform the level selection of luminance correction by operating the selection key 25 or the selection key 26 while watching the joint of images.

In the stage where a fine adjustment is performed, it is a precondition that the device is in a state where the correction starting point AE and the correction end point BS have been selected and based on these points, a correction waveform T, has been selected. Therefore, in the fine adjustment, the fine adjustment data shown in FIGS. 5A to 5E is selected for the correction waveform selected by the correction starting point AE and the correction end point BS, and the luminance correction can be performed by superposing the selected data on the correction waveform stored in the buffer memory 9. The superposition processing of the fine adjustment data is performed, for example, in the buffer memory 9 being controlled by the control portion 10.

Figures 5A, 5B, 5C, 5D, 5E:
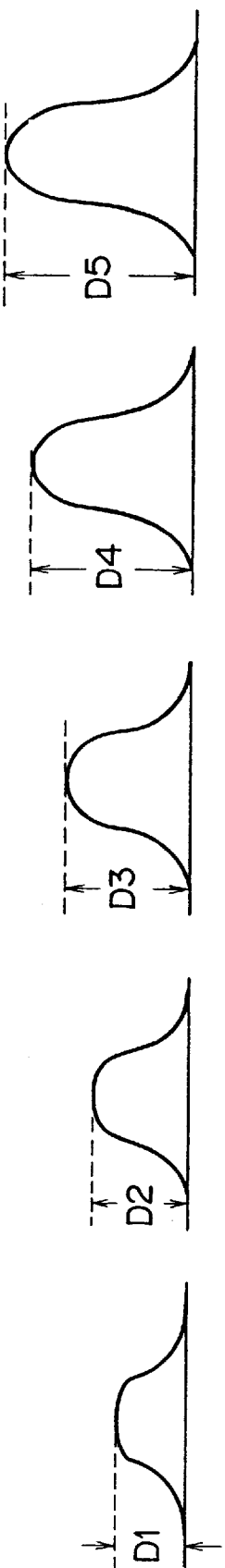
FIGS. 5A to 5E show drawings for explaining fine adjustment data.

As fine adjustment data, the level shown, for example, in FIG. 5C is considered to be a reference level, and the luminance level is increased toward FIG. 5E and decreased toward FIG. 5A.

Therefore, the fine adjustment data shown in these figures have different adjustment levels D (D1 to D5) from each other and each of them shows the depth of adjustment. In the fine adjustment mode, the fine adjustment data shown in FIGS. 5A to 5E can be selected by operating the selection key 25 or the selection key 26, which makes it possible to perform the luminance correction corresponding to the adjustment level D.

Therefore, the luminance in the overlapped area in the projected image is changed corresponding to the operation of the selection key L or the selection key R.

In FIGS. 5A to 5E, for example, intermittently 5 stages of fine adjustment data is shown, but actually, for example, it is arranged to be able to select adjustment stages of, for example, in the order of 100 stages. In short, a kind of data can be selected out of, for example, 100 kinds of data by operating the selection key 25 or the selection key 26.

In a case where fine adjustment is to be actually performed, for example, in a case where luminance is lowered more than a necessary degree as shown in FIG. 4D and FIG. 4E, the fine adjustment data of a comparatively high level such as an adjustment level D4 or D5 as shown in FIG. 5D and FIG. 5E will be selected. In a case where, for example, the luminance becomes high more than a necessary degree as shown in FIG. 4A and FIG. 4B, the fine adjustment data of a comparatively low level such as an adjustment level D1 or D2 as shown in FIG. 5A or FIG. 5B will be selected.

The correction waveforms T of which detailed luminance correction is performed by the fine adjustment data are read out from the buffer memory 9 at a predetermined timing and sent to the multipliers 3 (a, b and c) through the D/A converter 14 and the filter 15, and at the multipliers 3 (a, b and c) the correction waveforms T are superposed on the video signals, R, G and B.

In the above embodiment, the example is cited in which there are 264 kinds of correction waveforms T and fine adjustment data of 100 kinds; however, if good correction is possible, the number of data need not to be always as many as that shown in the above. In other words, in a case where a user wants to perform more detailed correction, the kinds of data can be increased or in a case where such a detailed correction is not needed the kinds of data can be decreased.

The constitution of the block diagram shown in FIG. 1 has a plurality of data flows corresponding to split images as mentioned in the above; however, the control portion 10, a correction memory 11, a fine adjustment data memory 13, or the like are, as one unit of SEM device, not needed to be multiplexed. In other words, the control portion 10, the correction memory 11 and the fine adjustment data memory 13 can be used in common for all paths of signal flow, and for example, they can be constituted as a fixed slot of a frame work.

It can be considered that the functional blocks concerning the video signal processing as shown in FIG. 1 are integrated, for example, on a piece of substrate, and it is incorporated in a projector device, a video display device. In this case, the remote controller is constituted as an input means for executing a necessary control on the projector device. Thereby, it is made possible to provide the projector device with a function, for example, to discriminate a synchronizing signal or a selected correction waveform, which lightens the load of the control portion of the SEM device 1 and also lowers the cost of the video signal processing apparatus.

Further in the above embodiment, the example in which split images are adjacent to each other in the horizontal direction; however it can be considered that when more than six split images are displayed being adjacent to each other, two sets of three split images are disposed in two rows to be adjacent to each other in the vertical direction. In this case, a correction process is executed in the overlapped area being adjacent to each other in the vertical direction for obtaining such a luminance characteristic as to perform fade-in and fade-out in every horizontal line period. In other words, a necessary correction processing can be naturally performed in a video signal processing apparatus according to the present invention by providing the device with a function to store correction data for the overlapped area of split images being adjacent to each other in the vertical direction.

While a preferred embodiment of the present invention has been described using specific terms, such description is for illustrative purposes only, and it is to be understood that changes and variations may be made without departing from the spirit or scope of the following claims.

What is claimed is:

1. A video signal processing apparatus composing images formed from a plurality of input video signals in placing the images adjacent to each other, in order to display a composite image as an image, setting end parts of adjacent images as an overlapped area, and performing a correction process of a luminance level of the video signals corresponding to said overlapped area with correction data, comprising:

setting means for setting a correction starting position and a correction end position in said overlapped area, correction data storage means for storing a plurality of correction data corresponding to said correction starting position and said correction end position, and control means for controlling the read-out of the predetermined correction data from said correction data storage means based on the setting of said correction starting position and said correction end position.

2. A video signal processing apparatus as in claim 1, including fine adjustment data storage means for storing a plurality of fine adjustment data for performing fine adjustment of a predetermined luminance level for the correction data selected by said control means, and means for performing fine adjustment of a luminance level in said overlapped area by selectively superposing said fine adjustment data on said selected correction data based on the setting of said correction starting position and said correction end position.

3. A video signal processing apparatus as in claim 1, further comprising means for correcting said overlapped area by performing a fade-in process of a luminance level for one of said adjacent images relative to another and a fade-out process of the luminance level for the other of said adjacent images.

4. A video signal processing apparatus as in claim 1, further comprising means for correcting said overlapped area of images adjacent each other in the vertical direction by performing a fade-in process to vary the luminance level in every horizontal line of a video signal corresponding to said overlapped area for one of said adjacent images relative to another, and a fade-out process to vary the luminance level in every horizontal line of the video signal corresponding to said overlapped area for the other of said adjacent images.

5. A video signal processing apparatus as in claim 1, wherein said setting means is a remote controller.

6. A composite image projector apparatus including a video signal processing portion comprising:

a plurality of projector devices for projecting a composite image formed by composing images obtained from a plurality of video signals so as to place said images adjacent each other on a screen, setting means for setting a correction starting position and a correction end position in an overlapped area in which end parts of adjacent images overlie each other, correction data storage means for storing a plurality of correction data corresponding to said correction starting position and said correction end position, control means for controlling read-out of predetermined correction data from said correction data storage means based on the setting of said correction starting position and said correction end position, and correction processing means for correcting the luminance level of the video signal by said correction data.

7. A composite image projector apparatus as in claim 6, wherein said video signal processing portion includes fine adjustment data storage means for storing a plurality of fine adjustment data for performing fine adjustment of a predetermined luminance level for correction data selected by said control means and for performing fine adjustment of the luminance level in said overlapped area by selectively superposing said fine adjustment data upon said selected correction data based on the setting of said correction starting position and said correction end position.

8. A composite image projector apparatus as in claim 6, wherein said correction processing means corrects the video signal in said overlapped area by a fade-in process of the luminance level for one of said images adjacent to another image and a fade-out process of the luminance level for the other image.

9. A composite image projector apparatus as in claim 6, wherein said correction processing means corrects the video signal in the overlapped area of images adjacent each other in the vertical direction by performing a fade-in process to vary the luminance level in every horizontal line of the video signal corresponding to said overlapped area for one of said adjacent images, and a fade-out process to var the luminance level in every horizontal line of the video signal corresponding to said overlapped area for the other adjacent image.

10. A composite image projector apparatus as in claim 6, wherein said setting means is a remote controller.

11. A composite image adjustment method comprising the steps of:

forming adjacent images from a plurality of video signals to compose a composite image on a screen, setting a correction starting position and a correction end position in an overlapped area of the composite image in which end parts of adjacent images overlie each other, storing a plurality of correction data corresponding to said correction starting position and said correction end position, reading out predetermined stored correction data based on the setting of said correction starting position and said correction end position, and correcting the luminance level of a video signal by said correction data.

12. A composite image adjustment method as in claim 11, further comprising the steps of storing a plurality of fine adjustment data for performing fine adjustment of a predetermined luminance level for selected correction data and performing fine adjustment of the luminance level in said overlapped area by selectively superposing said fine adjustment data upon said selected correction data based on the setting of said correction starting position and said correction end position.

* * * * *